United States Patent
Deng et al.

(10) Patent No.: US 10,926,735 B2
(45) Date of Patent: Feb. 23, 2021

(54) VEHICLE SEAT SIDE AIRBAG

(71) Applicant: Ford Global Technologies, LLC, Dearborn, MI (US)

(72) Inventors: Zhibing Deng, Northville, MI (US); Joseph Edward Abramczyk, Farmington Hills, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 16/373,290

(22) Filed: Apr. 2, 2019

(65) Prior Publication Data

US 2020/0317155 A1 Oct. 8, 2020

(51) Int. Cl.
*B60R 21/2338* (2011.01)
*B60R 21/20* (2011.01)
*B60R 21/233* (2006.01)
*B60R 21/00* (2006.01)

(52) U.S. Cl.
CPC .......... *B60R 21/2338* (2013.01); *B60R 21/20* (2013.01); *B60R 21/233* (2013.01); *B60R 2021/0032* (2013.01); *B60R 2021/23324* (2013.01); *B60R 2021/23382* (2013.01)

(58) Field of Classification Search
CPC ................ B60R 21/207; B60R 21/233; B60R 2021/23146; B60R 21/23161; B60R 21/23308; B60R 21/23382
See application file for complete search history.

(56) References Cited

U.S. PATENT DOCUMENTS

| | | | |
|---|---|---|---|
| 5,222,761 A * | 6/1993 | Kaji | B60R 21/017 280/730.2 |
| 7,717,459 B2 | 5/2010 | Bostrom et al. | |
| 8,657,330 B1 * | 2/2014 | Choi | B60R 21/23138 280/730.2 |
| 9,566,929 B1 * | 2/2017 | Belwafa | B60R 21/23138 |
| 9,650,011 B1 * | 5/2017 | Belwafa | B60R 21/233 |
| 9,688,232 B1 * | 6/2017 | Loew | B60R 21/231 |
| 9,994,181 B1 | 6/2018 | Dubaisi et al. | |
| 10,131,312 B2 | 11/2018 | Wiik et al. | |
| 2007/0096444 A1 * | 5/2007 | Bostrom | B60R 21/23138 280/730.2 |
| 2008/0129020 A1 * | 6/2008 | Bostrom | B60R 21/207 280/728.2 |

(Continued)

FOREIGN PATENT DOCUMENTS

| | | |
|---|---|---|
| JP | 2009154709 A | 7/2009 |
| JP | 2010115947 A | 5/2010 |

(Continued)

*Primary Examiner* — Barry Gooden, Jr.
(74) *Attorney, Agent, or Firm* — Frank A. MacKenzie; Bejin Bieneman PLC

(57) ABSTRACT

A restraint system includes a seat, a center console spaced from the seat in a cross-vehicle direction, and an airbag inflatable to an inflated position. The airbag in the inflated position includes a first leg elongated in the cross-vehicle direction and spaced from the center console. The airbag in the inflated position includes a second leg supported by the seat and elongated from the first leg towards the center console in a direction transverse to the cross-vehicle direction.

20 Claims, 10 Drawing Sheets

(56) References Cited

U.S. PATENT DOCUMENTS

| | | | |
|---|---|---|---|
| 2009/0001695 A1* | 1/2009 | Suzuki | B60R 21/231 280/730.2 |
| 2010/0264631 A1* | 10/2010 | Tomitaka | B60R 21/231 280/730.2 |
| 2010/0283230 A1* | 11/2010 | Tomitaka | B60R 21/231 280/730.2 |
| 2010/0295280 A1* | 11/2010 | Tomitaka | B60R 21/23138 280/730.1 |
| 2010/0314859 A1* | 12/2010 | Tomitaka | B60R 21/232 280/730.2 |
| 2011/0309603 A1* | 12/2011 | Choi | B60R 21/231 280/729 |
| 2012/0091697 A1* | 4/2012 | Wiik | B60R 21/23138 280/730.2 |
| 2012/0119475 A1* | 5/2012 | Choi | B60R 21/233 280/729 |
| 2013/0200598 A1* | 8/2013 | Honda | B60R 21/20 280/730.2 |
| 2014/0084571 A1* | 3/2014 | Hotta | B60R 21/23138 280/729 |
| 2014/0151984 A1* | 6/2014 | Fukawatase | B60R 21/23138 280/730.2 |
| 2015/0048602 A1* | 2/2015 | Gwon | B60R 21/23138 280/729 |
| 2015/0076803 A1* | 3/2015 | Fujiwara | B60R 21/23138 280/730.2 |
| 2015/0239423 A1* | 8/2015 | Hayashi | B60R 21/2338 280/729 |
| 2015/0274110 A1* | 10/2015 | Ishida | B60R 21/01512 280/729 |
| 2015/0353045 A1* | 12/2015 | Sendelbach | B60R 21/2334 280/729 |
| 2015/0367811 A1* | 12/2015 | Kobayashi | B60R 21/239 280/730.2 |
| 2016/0114756 A1* | 4/2016 | Fujiwara | B60R 21/23138 280/729 |
| 2016/0159307 A1* | 6/2016 | Fujiwara | B60R 21/263 280/729 |
| 2017/0158160 A1 | 6/2017 | Sugimori et al. | |
| 2017/0232922 A1* | 8/2017 | Wiik | B60R 21/2338 280/730.2 |
| 2018/0222433 A1* | 8/2018 | Byun | B60R 21/2338 |
| 2019/0092271 A1* | 3/2019 | Park | B60R 21/23138 |
| 2020/0062212 A1* | 2/2020 | Markusic | B60R 21/207 |
| 2020/0180546 A1* | 6/2020 | Komura | B60R 21/233 |

FOREIGN PATENT DOCUMENTS

| | | |
|---|---|---|
| JP | 5131658 B2 | 1/2013 |
| KR | 20110047559 A | 5/2011 |

* cited by examiner

VEHICLE SEAT SIDE AIRBAG

BACKGROUND

A side airbag is mounted to a seatback and is inflatable along a side of an occupant, specifically along the torso and/or hip of the occupant. The side airbag, for example, may be inflatable between the occupant and a center console. The side airbag controls the kinematics of the occupant in vehicle impacts that urge the occupant in a cross-vehicle direction, e.g., a side impact.

DETAILED DESCRIPTION

Figure 1:
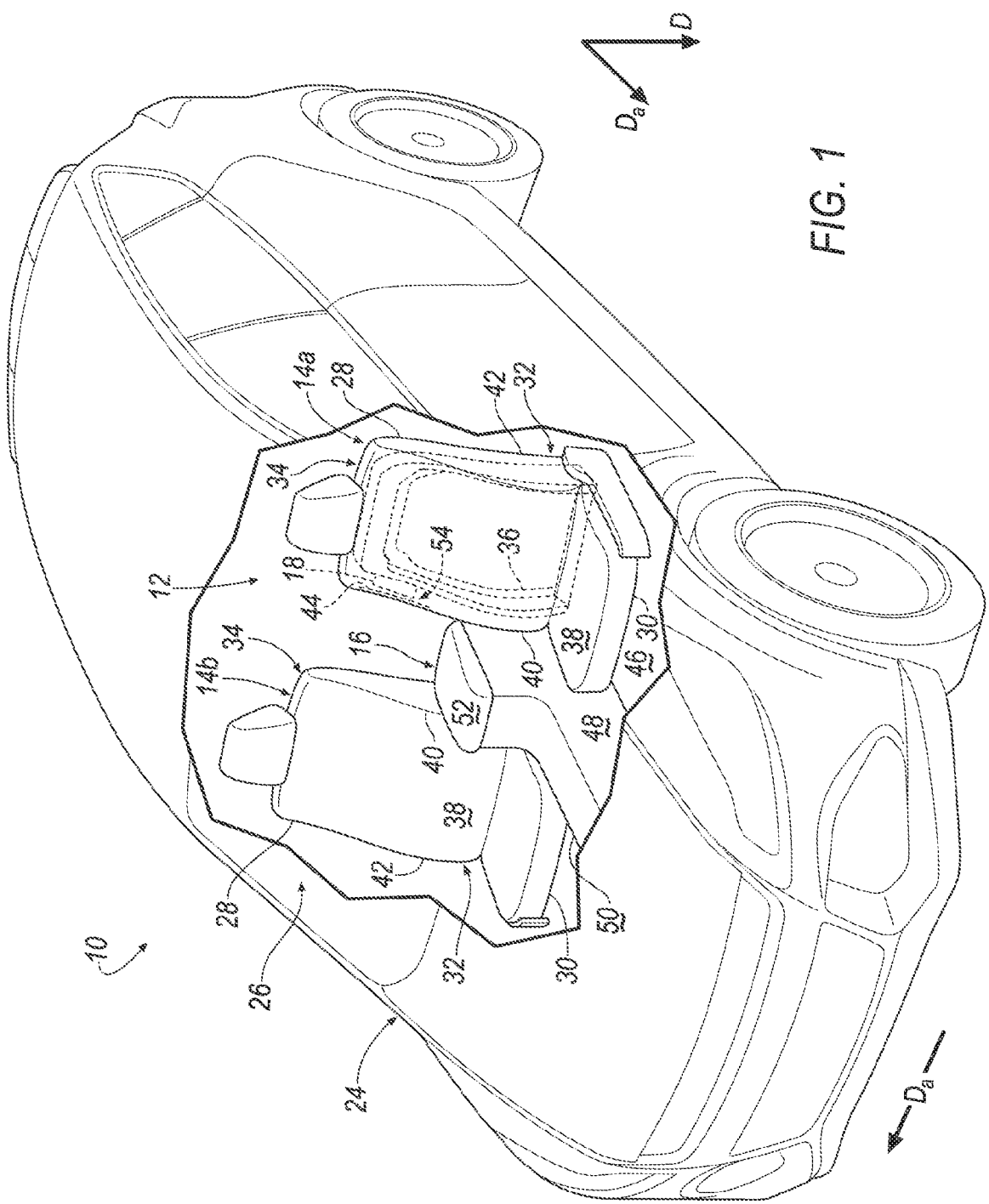
FIG. 1 is a perspective view of a vehicle including two seats and an airbag mounted to one seat in an uninflated position.

A system includes a seat, a center console spaced from the seat in a cross-vehicle direction, and an airbag inflatable to an inflated position. The airbag in the inflated position includes a first leg elongated in the cross-vehicle direction and spaced from the center console. The airbag in the inflated position includes a second leg supported by the seat and elongated from the first leg towards the center console in a direction transverse to the cross-vehicle direction.

The first leg and the second leg each may include a first depression facing the seat and a second depression facing away from the seat and spaced from the first depression in the cross-vehicle direction.

The airbag may define an inflation chamber and may include two internal tethers disposed in the inflation chamber. Each internal tether may extend from the first depression to the second depression of the respective leg.

The airbag may include an upper baffle extending across the inflation chamber between the first leg and the second leg and dividing the inflation chamber into an upper inflation chamber and a lower inflation chamber. The upper baffle may include at least one vent.

The first depression of the first leg may be disposed adjacent a head of an occupant between 5th-percentile female and 95th-percentile male stature sitting in the seat.

The first depression of the second leg may be disposed adjacent a shoulder of an occupant between 5th-percentile female and 95th-percentile male stature sitting in the seat.

The airbag in the inflated position may include an extension elongated from the second leg in the direction. The extension may be disposed between the center console and the seat.

The airbag may define an inflation chamber and may include an upper baffle extending across the inflation chamber between the first leg and the second leg and dividing the inflation chamber into an upper chamber and a lower chamber. The upper baffle may include at least one vent.

The airbag may include a lower baffle extending across the inflation chamber between the second leg and the extension and dividing the inflation chamber into the lower chamber and an extension chamber. The lower baffle may include at least one vent.

The extension and the second leg each may include a bottom spaced from the first leg in the direction. The bottom of the second leg may be disposed between the first leg and the bottom of the extension.

The center console may include a top disposed between the bottom of the extension and the bottom of the second leg.

The system may include a second extension elongated from the second leg in the direction. The center console may be disposed between the extension and the second extension.

The extension may be disposed adjacent to a hip of an occupant between 5th-percentile female and 95th-percentile male stature sitting in the seat.

The extension may be spaced from the first leg in the direction. The extension and the first leg may define a gap therebetween.

The gap may be disposed adjacent to a shoulder of an occupant between 5th-percentile female and 95th-percentile male stature sitting in the seat.

The first leg and the second leg each may include a first side and a second side spaced from each other in the cross-vehicle direction. Each of the first sides may face the seat.

The first side and the second side of the second leg may be disposed between the first side and the second side of the first leg.

The second leg may bisect the first leg.

The system may include two external tethers spaced from each other in the cross-vehicle direction. Each external tether may extend from the first leg to the second leg.

The first leg may be disposed adjacent a head of an occupant between 5th-percentile female and 95th-percentile male stature sitting in the seat.

With reference to the Figures, wherein like numerals indicate like parts throughout the several views, a vehicle 10 is generally shown. The vehicle 10 includes a restraint system 12 having a seat 14, a center console 16 spaced from the seat 14 in a cross-vehicle direction Dc, and an airbag 18 inflatable to an inflated position. The airbag 18 in the inflated position includes a first leg 20 elongated in the cross-vehicle direction Dc and spaced from the center console 16. The airbag 18 in the inflated position includes a second leg 22 supported by the seat 14 and elongated from the first leg 20 towards the center console 16 in a direction D transverse to the cross-vehicle direction Dc.

During a vehicle impact, the airbag 18 may be deployed from an uninflated position, as shown in FIG. 1, to the inflated position, as shown in FIGS. 2-5B. During the vehicle impact, e.g., a far side oblique impact, an occupant may be forced into the airbag 18 in the inflated position. During the far side oblique impact, the airbag 18 may provide coverage so as to absorb energy of the occupant. During these types of impacts, the airbag 18 may assist in retaining the occupant on the seat 14. For example, the airbag 18 may slow or stop the occupant from moving obliquely off the seat 14. By retaining the occupant on the seat 14, the airbag 18 absorbs energy from the occupant of the seat 14 and may assist in preventing the occupant of the seat 14 from impacting other occupants or vehicle components during the far side oblique impact, which may reduce head inboard excursion of the occupant.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 may include two sides (not numbered) spaced from each other in the cross-vehicle direction Dc. The sides of the vehicle 10 may be elongated in a vehicle fore-and-aft direction Da. Each side of the vehicle 10 may be similar or identical to each other.

With reference to FIG. 1, the vehicle 10 includes a body 24 defining a passenger cabin 26. The passenger cabin 26 houses occupants, if any, of the vehicle 10. The passenger cabin 26 includes a front end (not numbered) and a rear end (not numbered) with the front end being in front of the rear end during forward movement of the vehicle 10. The passenger cabin 26 includes one or more seats 14. The seats 14 may be arranged in any suitable arrangement. For example, one or more of the seats 14 may be at the front end of the passenger cabin 26, i.e., a front seat, and/or one or more of the seats 14 may be at the rear end of the passenger cabin 26, i.e., a rear seat. Specifically, the passenger cabin 26 may include two front seats 14, i.e., a driver seat 14a and a passenger seat 14b, spaced from each other in the cross-vehicle direction Dc.

With reference to the Figures, each seat 14 may include a seatback 28, a seat bottom 30, and a head restraint (not numbered). The head restraint may be supported by the seatback 28 and may be stationary or movable relative to the seatback 28. The seatback 28 may be supported by the seat bottom 30 and may be stationary or movable relative to the seat bottom 30. The seatback 28, the seat bottom 30, and/or the head restraint may be adjustable in multiple degrees of freedom. Specifically, the seatback 28, the seat bottom 30, and/or the head restraint may themselves be adjustable, in other words, adjustable components within the seatback 28, the seat bottom 30, and/or the head restraint, and/or may be adjustable relative to each other.

As shown in the Figures, the seatback 28 may include a lower end 32 adjacent to the seat bottom 30 and an upper end 34 spaced from the lower end 32. The upper end 34 may be adjacent to the head restraint. Specifically, the upper end 34 of the seatback 28 may support the head restraint. The seatback 28 may be elongated from the upper end 34 to the lower end 32 in the direction D, i.e., transverse to the cross-vehicle direction Dc and the vehicle fore-and-aft direction Da.

Each seat 14 may include a seat frame 36, as shown in FIG. 1. The seat frame 36 may include tubes, beams, etc. The seat frame 36 may be formed of any suitable plastic material, e.g., carbon fiber reinforced plastic (CFRP), glass fiber-reinforced semi-finished thermoplastic composite (organosheet), etc. As another example, some or all components of the seat frame 36 may be formed of a suitable metal, e.g., steel, aluminum, etc.

A covering 38 may be supported on the seat frame 36. The covering 38 may include upholstery and padding. The upholstery may be formed of cloth, leather, faux leather, or any other suitable material. The upholstery may be stitched in panels around the seat frame 36. The padding may be between the covering 38 and the seat frame 36 and may be foam or any other suitable material.

With reference to FIG. 1, the seatback 28 may include an inboard side 40 and an outboard side 42 spaced from the inboard side 40 in the cross-vehicle direction Dc. The seatback 28 may terminate at the sides 40,42. The inboard side 40 may be disposed between the outboard side 42 and the center console 16 in the cross-vehicle direction Dc. A backrest (not numbered) may extend from the inboard side 40 to the outboard side 42. The sides 40,42 of the seatback 28 may extend from the backrest in a direction that an occupant of the seat 14 would face, that is, in a forward direction as defined by the seat 14. The sides 40,42 of the seatback 28 may extend along the seatback 28 in an upward direction as defined by the seat 14. For example, the sides 40,42 of the seatback 28 may extend from the lower end 32 towards the upper end 34 of the seatback 28. The sides 40,42 of the seatback 28 may support an occupant laterally relative to the seat 14.

With reference to FIG. 1, the seatback 28, e.g., the covering 38, may include a tear seam 44. The tear seam 44 may be disposed on one side 40, 42 of the seatback 28. As shown in FIG. 1, the tear seam 44 may be disposed on the inboard side 40. For example, the tear seam 44 may be disposed adjacent to the airbag 18. Said differently, the airbag 18 may extend through the tear seam 44 in the inflated position. The tear seam 44 may have any suitable shape. For example, the tear seam 44 may have a linear shape, i.e., extending in a line along the seatback 28. Alternatively, the tear seam 44 may have a circular shape, e.g., extending around the airbag 18.

The tear seam 44 may be designed to tear apart when subjected to a tensile force above a threshold magnitude. In other words, the covering 38 on one side of the tear seam 44 separates from the covering 38 on the other side of the tear seam 44 when the force is above the threshold magnitude. The threshold magnitude may be chosen to be greater than forces from, e.g., inadvertent pushing against the seatback 28 by an occupant but be less than forces from the deployment of the airbag 18. The tear seam 44 may be, for example, a line of perforations through the covering 38, a line of thinner covering material than the rest of the covering 38, etc.

With continued reference to FIG. 1, the body 24 includes a floor 46. The floor 46 may define the lower boundary of the passenger cabin 26 and may extend from the front end of the passenger cabin 26 to the rear end of the passenger cabin 26. Additionally, the floor 46 may extend from one side of the vehicle 10 to another side of the vehicle 10.

Each seat 14 is supported by the floor 46, as shown in FIG. 1. The position and orientation of the seats 14 and components thereof may be adjustable by an occupant. In this situation, each seat 14 may slide relative to the floor 46, e.g., in the vehicle fore-and-aft direction Da, along a seat track (not shown). As another example, each seat 14 may be fixed relative to the floor 46. In this situation, the seats 14 may be immovable relative to the floor 46.

With continued reference to FIG. 1, the center console 16 is disposed in the passenger cabin 26 and fixed to the floor 46. The center console 16 may, for example, be disposed between the front seats 14. The center console 16 may be elongated in the vehicle fore-and-aft direction Da. The center console 16 may support vehicle components, e.g., a gear selector, cup holders, a storage bin, etc. The center console 16 may include multiple components, e.g., panels, brackets, etc., subsequently assembled together. Alternatively, the center console 16 may be a unitary construction. The center console 16 may be any suitable type of material, e.g., plastic.

With continued reference to FIG. 1, the center console 16 may include a first surface 48 and a second surface 50 spaced from the first surface 48 in the cross-vehicle direction Dc. For example, the first surface 48 may be disposed adjacent to driver seat 14*a*, and the second surface 50 may be disposed adjacent to passenger seat 14*b*. The first surface 48 may face the driver seat 14*a*, and the second surface 50 may face the passenger seat 14*b*. The first surface 48 and the second surface 50 may each be elongated in the vehicle fore-and-aft direction Da. The first surface 48 and the second surface 50 may each extend upwardly from the floor 46.

With continued reference to FIG. 1, the center console 16 may include a top 52 spaced from the floor 46. The top 52 of the center console 16 may extend from the first surface 48 to the second surface 50 of the center console 16. In other words, the first surface 48 and the second surface 50 of the center console 16 may extend from the floor 46 to the top 52 of the center console 16. The top 52 of the center console 16 may be disposed above the seat bottom 30. In other words, the seat bottom 30 may be disposed between the top 52 of the center console 16 and the floor 46.

With continued reference to FIG. 1, the system may include an airbag assembly 54, which includes the airbag 18. The seatback 28 may support the airbag assembly 54, and specifically, may support the airbag 18 when the airbag 18 is in the inflated position. For example, the inboard side 40 of the seatback 28 may support the airbag assembly 54, as shown in the Figures. The airbag assembly 54 may be mounted to the seatback 28, as set forth below. The airbag assembly 54 may be supported on any one of the front seats 14.

The airbag assembly 54 may include a base (not shown) attached to the seatback 28 and supporting the airbag 18. The base may be flat. As another example, the base may include a cavity that may house the airbag 18 in the uninflated position and may support the airbag 18, e.g., the second leg 22, on the seatback 28 in the inflated position. In other words, the base may be a housing. The base may, for example, include clips, panels, etc. for attaching the airbag 18 and for attaching the airbag assembly 54 to the seat 14.

The airbag 18 may be formed of any suitable type of material, e.g., from a woven polymer. For example, the airbag 18 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

The airbag 18 may be a single continuous unit, e.g., a single piece of fabric. Alternatively, the airbag 18 may include a plurality of segments, i.e., two or more. The segments may be attached to each other in any suitable fashion, e.g., a plurality of panels attached by stitching, ultrasonic welding, etc.

The airbag 18 may be supported by the seatback 28 of one seat 14. For example, the airbag assembly 54 may be supported by the driver seat 14*a*, e.g., the inboard side 40 of the seatback 28, as shown in the Figures. Specifically, the airbag assembly 54 may be fixed to the seat frame 36. The airbag 18 may, for example, be disposed in the seatback 28 in the uninflated position, i.e., between the covering 38 and the seat frame 36, as shown in FIG. 1. In other words, the covering 38 may cover the airbag 18 in the uninflated position. In the inflated position, the airbag 18 may extend through the inboard side 40 of the seatback 28, i.e., the tear seam 44 disposed on the inboard side 40, as shown in FIGS. 2A-5B. For example, the airbag 18 may extend in the cross-vehicle direction Dc towards the other front seat, i.e., the passenger seat 14*b*. Additionally, the airbag 18 may inflate in the vehicle fore-and-aft direction Da.

With reference to FIGS. 2A-5B, the first leg 20 may, for example, be disposed adjacent to the upper end 34 of each seatback 28. Specifically, the first leg 20 may be disposed adjacent a head of an occupant between 5th-percentile female and 95th-percentile male stature sitting in the respective seat 14. In other words, the first leg 20 may be disposed adjacent to the head of the occupant in each front seat. The $5^{th}$ percentile female and $95^{th}$ percentile male stature may be based on a standards-setting body, e.g., a government agency such as the National Highway Traffic Safety Administration (NHTSA). As one example, NHTSA has defined the $5^{th}$ percentile female stature to be 5 feet tall and 1 pounds, e.g., the Hybrid III $5^{th}$ percentile female. As another example, NHTSA has defined the $95^{th}$ percentile male stature to be 6 feet 2 inches tall and 2 pounds, e.g., the Hybrid III $95^{th}$ percentile male.

With continued reference to FIGS. 2A-5B, in the inflated position, the first leg 20 may include a first side 56 and a second side 58 spaced from each other in the cross-vehicle direction Dc. For example, the first side 56 of the first leg 20 may be disposed adjacent to the upper end 34 of the seatback 28 of the driver seat 14*a*, and the second side 58 of the first leg 20 may be disposed adjacent to the upper end 34 of the seatback 28 of the passenger seat 14*b*. The first side 56 of the first leg 20 may face the driver seat 14*a*, and the second side 58 of the first leg 20 may face the passenger seat 14*b*. Said differently, the first side 56 and the second side 58 each may face an intended occupant, e.g., the occupant of the respective seat 14, in the inflated position. Specifically, the first side 56 and the second side 58 are positioned to receive and be impacted by the head of the occupant, e.g., between 5th-percentile female and 95th-percentile male stature, seated in the respective seat 14 when the airbag 18 is inflated during an impact that urges the occupant towards the airbag 18.

With continued reference to FIGS. 2A-5B, in the inflated position, the first leg 20 may include a top 60 and a bottom 62 spaced from each other in the direction D. Each side 56, 58 of the first leg 20 may extend from the top 60 to the bottom 62. The top 60 may be elongated from the first side 56 to the second side 58 in the cross-vehicle direction Dc. The bottom 62 may extend from each side 56, 58 of the first leg 20 to the second leg 22.

As set forth above, the second leg 22 is elongated from the first leg 20 towards the center console 16. In other words, the second leg 22 is disposed between the bottom 62 of the first leg 20 and the top 52 of the center console 16, as shown in the Figures. Said differently, the second leg 22 may be disposed between the upper end 34 of the seatback 28 and the lower end 32 of the seatback 28.

With reference to FIGS. 2A-5B, the second leg 22 may include a first side 64 and a second side 66 spaced from each other in the cross-vehicle direction Dc. Each side 64, 66 of the second leg 22 may be spaced from the respective side 56, 58 of the first leg 20. In other words, the second leg 22 may be disposed between the first side 56 and the second side 58 of the first leg 20. The bottom 62 of the first leg 20 may extend from each side 56, 58 of the first leg 20 to the respective side 64, 66 of the second leg 22. The sides 56, 58 of the first leg 20 may be spaced from each other in the cross-vehicle direction Dc farther than the sides 64, 66 of the second leg 22. In other words, the first leg 20 may be longer in the cross-vehicle direction Dc as compared to the second leg 22. The first side 56 of the first leg 20 may be disposed between the first side 64 of the second leg 22 and the driver seat 14a, and the second side 58 of the first leg 20 may be disposed between the second side 66 of the second leg 22 and the passenger seat 14b. In other words, the first side 64 of the second leg 22 may face the driver seat 14a, and the second side 66 of the second leg 22 may face the passenger seat 14b.

The sides 64, 66 of the second leg 22 may be spaced from the sides 56, 58 of the first leg 20 by any suitable amount. For example, the second leg 22 may bisect the first leg 20. In this situation, each side 64, 66 of the second leg 22 may be spaced from the respective side 56, 58 of the first leg 20 by the same amount. Said differently, the first leg 20 and the second leg 22 may be "T-shaped," as shown in the Figures As another example, one side of the second leg 22 may be disposed closer to the respective side 56, 58, of the first leg 20 as compared to the other side of the second leg 22.

Figure 2A:
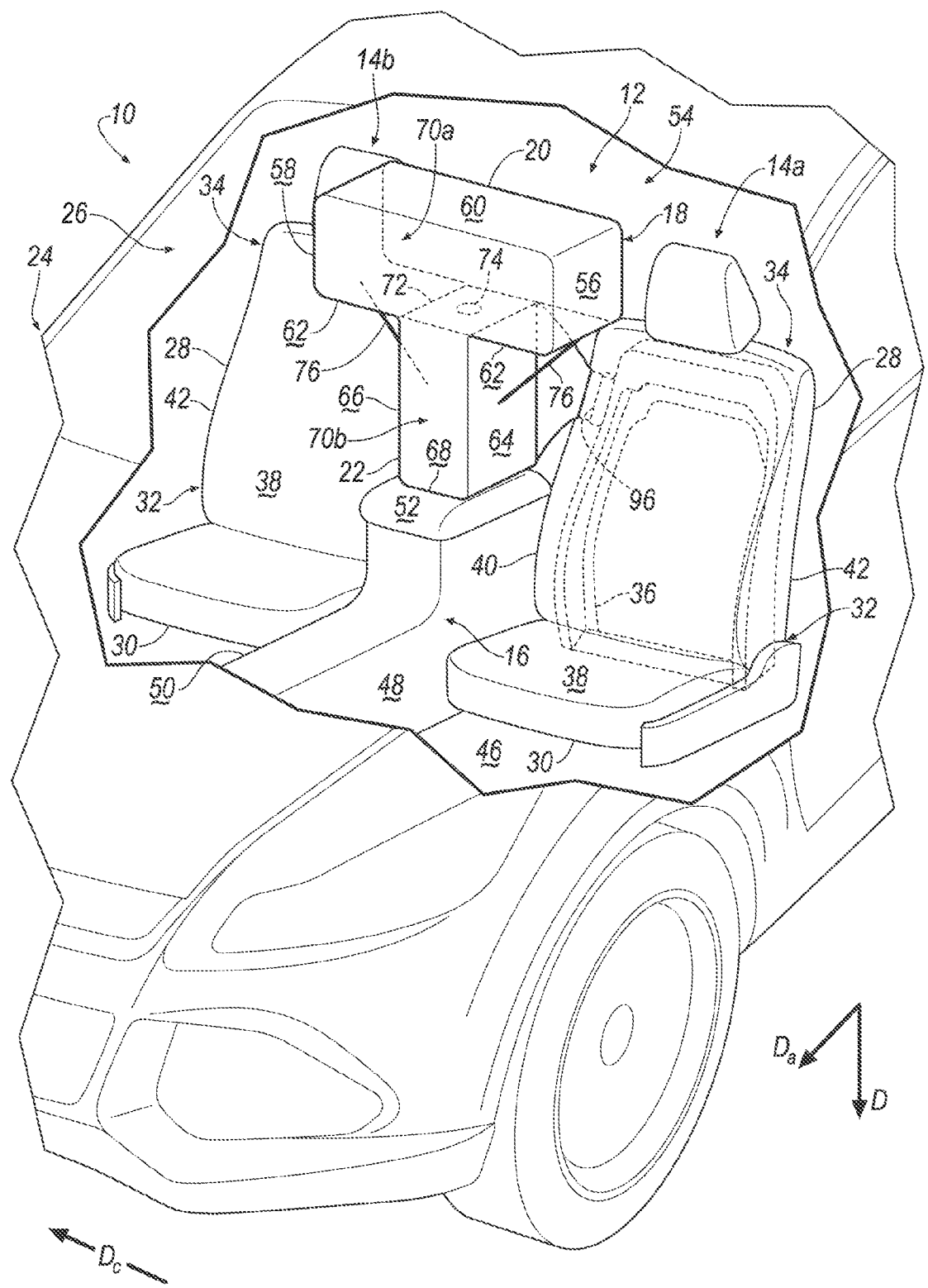
FIG. 2A is a perspective view of the vehicle including one embodiment of the airbag in an inflated position.
Figure 2B:
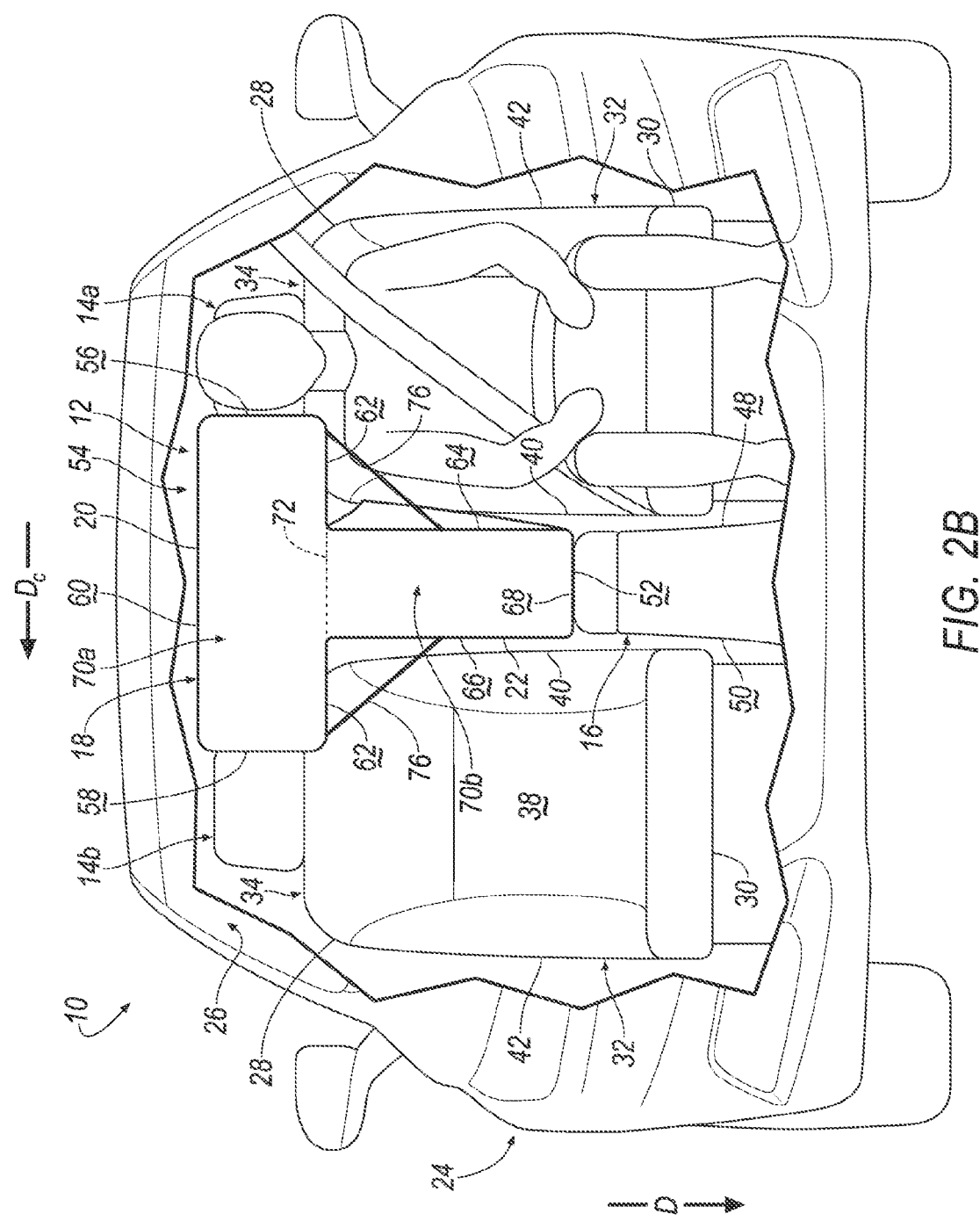
FIG. 2B is a front view of the embodiment of the airbag in the inflated position.

The first side 64 and the second side 66 of the second leg 22 each may be disposed at any suitable position relative to the center console 16. For example, the first side 64 of the second leg 22 may be disposed between the first surface 48 of the center console 16 and the driver seat 14a, as shown in FIG. 4B. As another example, the first side 64 of the second leg 22 may be aligned with, i.e., extend in a common plane, the first surface 48 of the center console 16, as shown in FIGS. 2B, 3B & 5B. The second leg 22 may extend at least partially across the center console 16 in the cross-vehicle direction Dc. For example, the second side 66 of the second leg 22 may be disposed between the first surface 48 and the second surface 50 of the center console 16, as shown in FIG. 4B. As another example, the second side 66 of the second leg 22 may be aligned with, i.e., extend in a common plane, the second surface 50 of the center console 16, as shown in FIGS. 2B, 3B & 5B. As yet, another example, the second side 66 of the second leg 22 may be disposed between the second surface 50 of the center console 16 and the passenger seat 14b.

With reference to FIGS. 2A-5B, in the inflated position, the second leg 22 may include a bottom 68 spaced from the first leg 20 in the direction D. Specifically, the first side 64 and the second side 66 of the second leg 22 each may be elongated from the bottom 62 of the first leg 20 to the bottom 68 of the second leg 22. In other words, the bottom 68 of the second leg 22 extends from the first side 64 to the second side 66 of the second leg 22. The bottom 68 of the second leg 22 may, for example, abut the top 52 of the center console 16. Alternatively, the bottom 68 of the second leg 22 may be spaced from the top 52 of the center console.

With continued reference to FIGS. 2A-5B, the airbag 18 may define an inflation chamber 70. The inflation chamber 70 may be inflatable from the uninflated position to the inflated position. The inflation chamber 70 may extend through both legs 20, 22 of the airbag 18. The airbag 18 may include an upper baffle 72 disposed in the inflation chamber 70. The upper baffle 72 may extend across the inflation chamber 70 between the first leg 20 and the second leg 22. In other words, the upper baffle 72 may extend across the inflation chamber 70, e.g., from the first side 64 to the second side 66 of the second leg 22, along the bottom 62 of the first leg 20. In this situation, the upper baffle 72 may divide the inflation chamber 70 into an upper inflation chamber 70a and a lower inflation chamber 70b. The upper inflation chamber 70a may be defined by the first leg 20 and the upper baffle 72, and the lower inflation chamber 70b may be defined by the second leg 22 and the upper baffle 72.

With continued reference to FIGS. 2A-5B, the upper baffle 72 may include at least one vent 74. For example, the upper baffle 72 may include one vent 74, as shown in the Figures. As another example, the upper baffle 72 may include a plurality of vents 74 spaced from each other. Each vent 74 allows fluid communication through the upper baffle 72. In other words, each vent 74 allows fluid to flow between the lower inflation chamber 70b and the upper inflation chamber 70a. Said differently, the lower inflation chamber 70b is in fluid communication with the upper inflation chamber 70a through the at least one vent 74 of the upper baffle 72. Each vent 74 may have any suitable size, e.g., diameter, and shape, e.g., circle. Each vent 74 may be any suitable type of vent, e.g., an active vent, a passive vent, a one-way vent, etc.

With continued reference to FIGS. 2A-5B, the airbag 18 may include a plurality of external tethers 76. Each external tether 76 may extend from the first leg 20 to the second leg 22 of the airbag 18. For example, as shown in the Figures, the airbag 18 may include two external tethers 76. The second leg 22 may be disposed between the external tethers 76. In such an example, the external tethers 76 may be mirror images of each other. The external tethers 76 may be attached to the first leg 20 and the second leg 22 in a same or different manner. The external tethers 76 may be attached to the first leg 20 and the second leg 22 in any suitable manner, e.g., stitching, ultrasonic welding, etc. The external tethers 76 may be any suitable material, e.g., woven nylon, fabric, etc.

With continued reference to FIGS. 2A-5B, each external tether 76 may be disposed at any suitable position along the airbag 18 in the vehicle fore-and-aft direction Da. In other words, each external tether 76 may be disposed at any suitable position between a front (not numbered) and a rear (not numbered) of the airbag 18. For example, each external tether 76 may be disposed at a midpoint, i.e., equidistant between, the front and the rear of the airbag 18, as shown in the Figures.

With continued reference to FIGS. 2A-5B, each external tether 76 may be attached to the bottom 62 of the first leg 20. For example, each external tether 76 may be attached at a transition (not numbered) from the bottom 62 of the first leg 20 to the respective side 56, 58, of the first leg 20. Alternatively, each external tether 76 may be attached at any suitable position along the bottom 62 of the first leg 20, i.e., between the respective side 56, 58, of the first leg 20 and the respective side 64, 66 of the second leg 22. The external tether may be attached at a same or different position on the bottom 62 of the first leg 20 relative to the second leg 22.

Each external tether 76 may be attached to the respective side 64, 66 of the second leg 22, as shown in the Figures. Each external tether 76 may be attached at any suitable position along the respective side 64, 66 of the second leg 22, i.e., between the bottom 62 of the first leg 20 and the bottom 68 of the second leg 22, as set forth further below. The external tethers 76 may be attached at a same or different position on the respective side 64, 66 of the second leg 22.

Figure 3A:
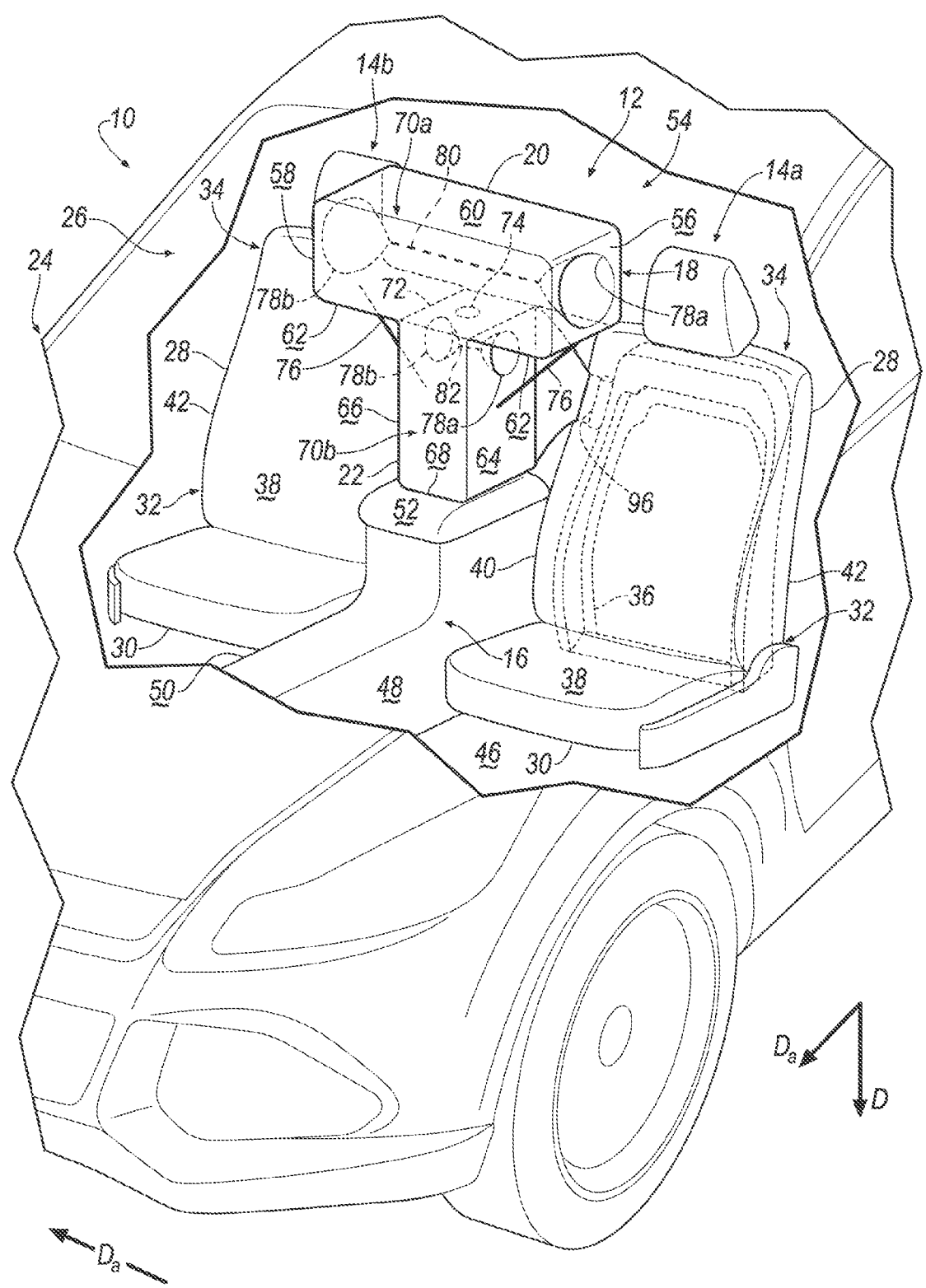
FIG. 3A is a perspective view of another embodiment of the airbag in the inflated position.
Figure 3B:
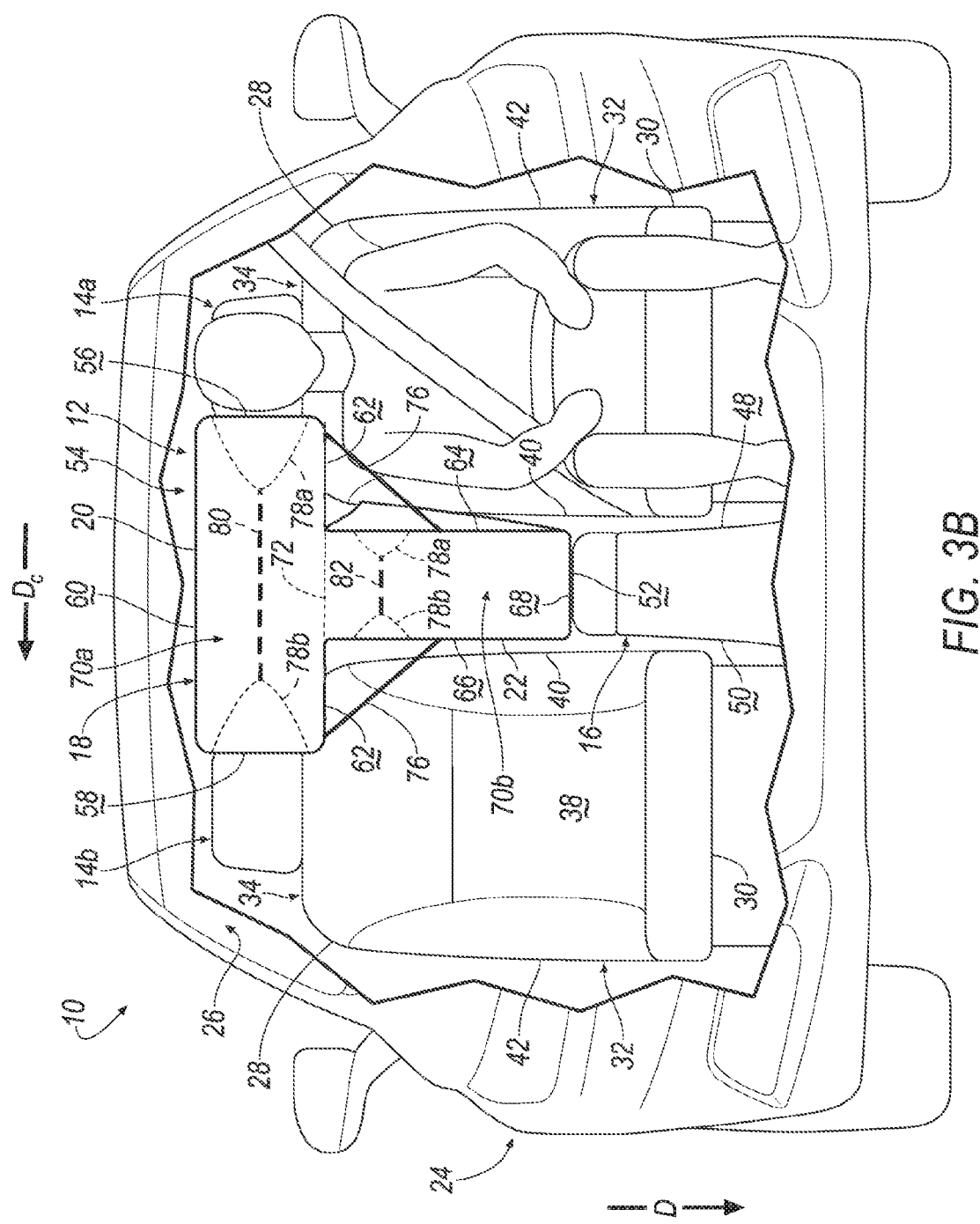
FIG. 3B is a front view of the embodiment of the airbag in the inflated position shown in FIG. 3A.

In the embodiment shown in FIGS. 3A-3B, the airbag 18 may include a depression 78 on each side 56, 58, 64, 66 of each leg 20, 22. For example, the first leg 20 and the second leg 22 may each include a first depression 78a facing the seat 14, e.g., the driver seat 14a, and a second depression 78b facing away from the seat 14, e.g., the driver seat 14a, and spaced from the first depression 78a in the cross-vehicle direction Dc.

As shown in FIGS. 3A-3B, the first depression 78a of the first leg 20 is disposed on the first side 56, and the second depression 78b of the first leg 20 is disposed on the second side 58. The first depression 78a of the first leg 20 may be concave relative to the driver seat 14a, and the second depression 78b of the first leg 20 may be concave relative to the passenger seat 14b. In other words, each depression, of the first leg 20 may extend inward relative to the respective seat 14, i.e., towards each other in the cross-vehicle direction Dc. The depressions 78 of the first leg 20 may be disposed adjacent a head of an occupant between 5th-percentile female and 95th-percentile male stature sitting in the respective seat 14. Specifically, the depressions 78 of the first leg 20 are positioned to receive the head of the occupant, e.g., between 5th-percentile female and 95th-percentile male stature, seated in the respective seat 14 when the airbag 18 is inflated during an impact that urges the occupant towards the airbag 18.

As shown in FIGS. 3A-3B, the first depression 78a of the second leg 22 is disposed on the first side 64, and the second depression 78b of the second leg 22 is disposed on the second side 66. The first depression 78a of the second leg 22 may be concave relative to the driver seat 14a, and the second depression 78b of the second leg 22 may be concave relative to the passenger seat 14b. In other words, each depression 78 of the second leg 22 may extend inward relative to the respective seat 14, i.e., towards each other in the cross-vehicle direction Dc. The depressions 78 of the second leg 22 may be disposed closer to the bottom 62 of the first leg 20 than the bottom 68 of the second leg 22. For example, the depressions 78 of the second leg 22 may be disposed adjacent a shoulder of an occupant between 5th-percentile female and 95th-percentile male stature sitting in the respective seat 14. Specifically, the depressions 78 of the second leg 22 are positioned to receive the shoulder of the occupant, e.g., between 5th-percentile female and 95th-percentile male stature, seated in the respective seat 14 when the airbag 18 is inflated during an impact that urges the occupant towards the airbag 18.

The depressions 78 of the first leg 20 and the depressions 78 of the second leg 22 may have any suitable depth. In other words, the depressions 78 of the first leg 20 and the depressions 78 of the second leg 22 may extend inwardly, i.e., away from the respective seat 14, any suitable amount. The depressions 78 of the first leg 20 and the depressions 78 of the second leg 22 may have a same or different depth. For example, the depressions 78 of the first leg 20 may extend farther in the cross-vehicle direction Dc than the depressions 78 of the second leg 22, i.e., the depression of the first leg 20 may be deeper than the depressions 78 of the second leg 22.

The depressions 78 of the first leg 20 and the depressions 78 of the second leg 22 may have any suitable shape, e.g., round. The depressions 78 of the first leg 20 and the depressions 78 of the second leg 22 may have any suitable size, e.g., diameter. The depressions 78 of the first leg 20 and the depressions 78 of the second leg 22 may have a same or different size. For example, the depressions 78 of the first leg 20 may be larger than the depressions 78 of the second leg 22. In other words, the depressions 78 of the first leg 20 may have a larger diameter than the depressions 78 of the second leg 22.

As shown in FIGS. 3A-3B, the external tethers 76 may be attached to the second leg 22 of the airbag 18 below the depressions 78 of the second leg 22. In other words, each depression of the second leg 22 may be disposed between the bottom 62 of the first leg 20 and the external tethers 76. Said differently, the external tethers 76 may extend across the depressions 78 of the second leg 22.

As shown in FIGS. 3A-3B, the airbag 18 may include an upper internal tether 80 disposed in the upper inflation chamber 70a, and a lower internal tether 82 disposed in the lower inflation chamber 70b. The internal tethers may be any suitable material, e.g., woven nylon, fabric, etc. The upper internal tether 80 may be elongated from the first depression 78a of the first leg 20 to the second depression 78b of the first leg 20 in the cross-vehicle direction Dc. The upper internal tether 80 may have a length in the cross-vehicle direction Dc. The upper internal tether 80 may have any suitable length. For example, the length of the upper internal tether 80 may be less than a length of the first leg 20 of the airbag 18. In other words, the upper internal tether 80 is shorter than the first leg 20 of the airbag 18 in the cross-vehicle direction Dc. The upper internal tether 80 may be fixed to each depression, of the first leg 20 by any suitable manner, e.g., stitching, ultrasonic welding, etc.

As shown in FIGS. 3A-3B, the lower internal tether 82 may be elongated from the first depression 78a of the second leg 22 to the second depression 78b of the second leg 22 in the cross-vehicle direction Dc. The lower internal tether 82 may have a length in the cross-vehicle direction Dc. The lower internal tether 82 may have any suitable length. For example, the length of the lower internal tether 82 may be less than a width of the second leg 22 of the airbag 18, i.e., the distance between the first side 56 and the second side 58 of the second leg 22 in the cross-vehicle direction Dc. The lower internal tether 82 may be fixed to each depression, of the second leg 22 by any suitable manner, e.g., stitching, ultrasonic welding, etc.

In the embodiments shown in FIGS. 4A-5B, the airbag 18 may include at least one extension 84 elongated from the second leg 22 in the direction D. For example, in the embodiment shown in FIGS. 4A-4B, the airbag 18 includes one extension 84 disposed between the center console 16 and the driver seat 14a. As another example, in the embodiment shown in FIG. 5A-5B, the airbag 18 includes a first extension 84a disposed between the center console 16 and the driver seat 14a and a second extension 84b disposed between the center console 16 and the passenger seat 14b. Common numerals are used to identify common features in the two embodiments.

Figure 4A:
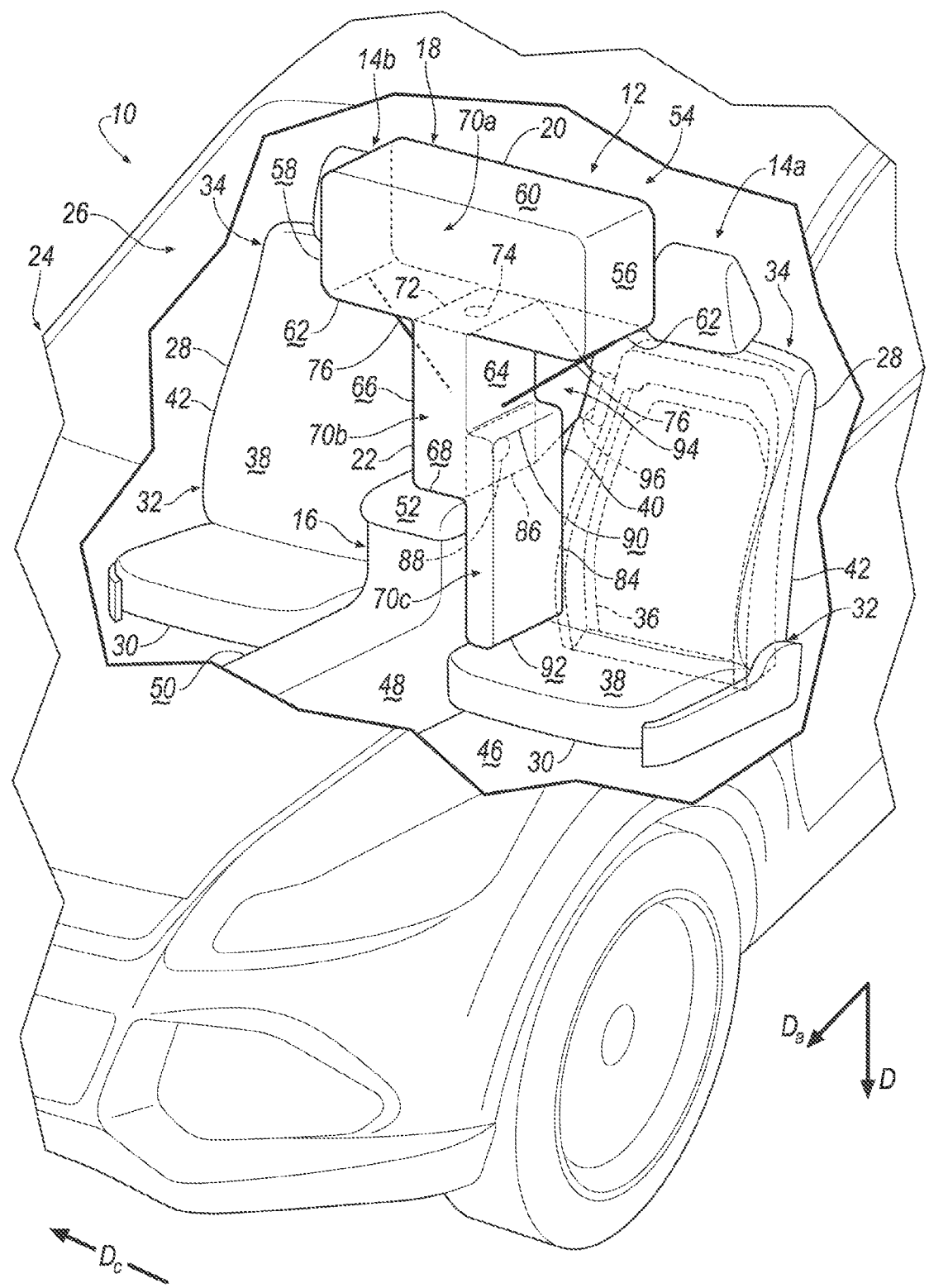
FIG. 4A is a perspective view of another embodiment of the airbag in the inflated position.
Figure 4B:
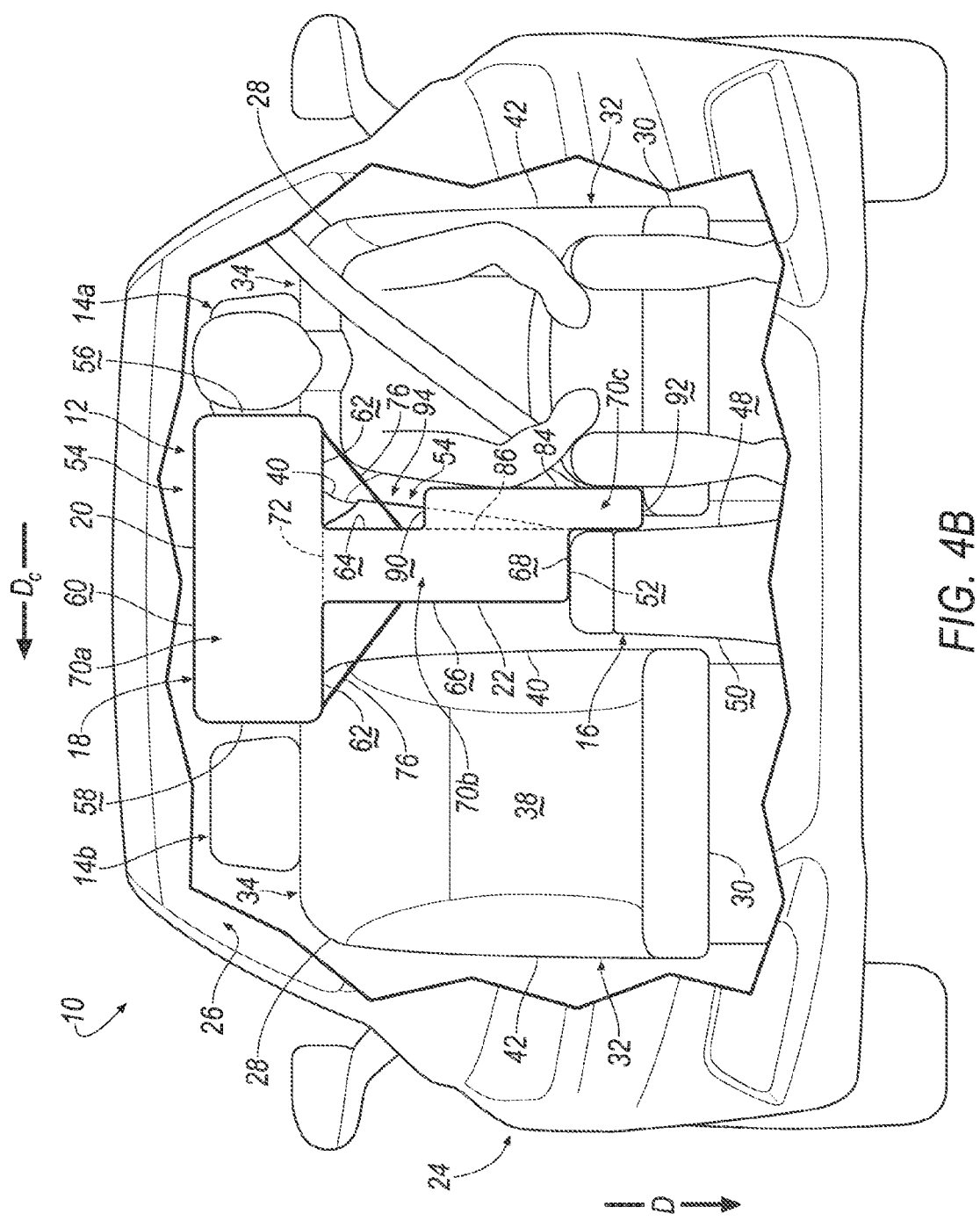
FIG. 4B is a front view of the embodiment of the airbag in the inflated position shown in FIG. 4A.

In the embodiment shown in FIGS. 4A-4B, the extension 84 is disposed between the center console 16 and the seat 14, as set forth above. Specifically, the extension 84 may be disposed between the first surface 48 of the center console 16 and the driver seat 14a. In other words, the extension 84 may extend from the first side 64 of the second leg 22. The extension 84 may, for example, abut the center console 16. Alternatively, the extension 84 may be spaced from the center console 16. The extension 84 may extend between the center console 16 and the driver seat 14a any suitable amount in the vehicle fore-and-aft direction Da.

Figure 5A:
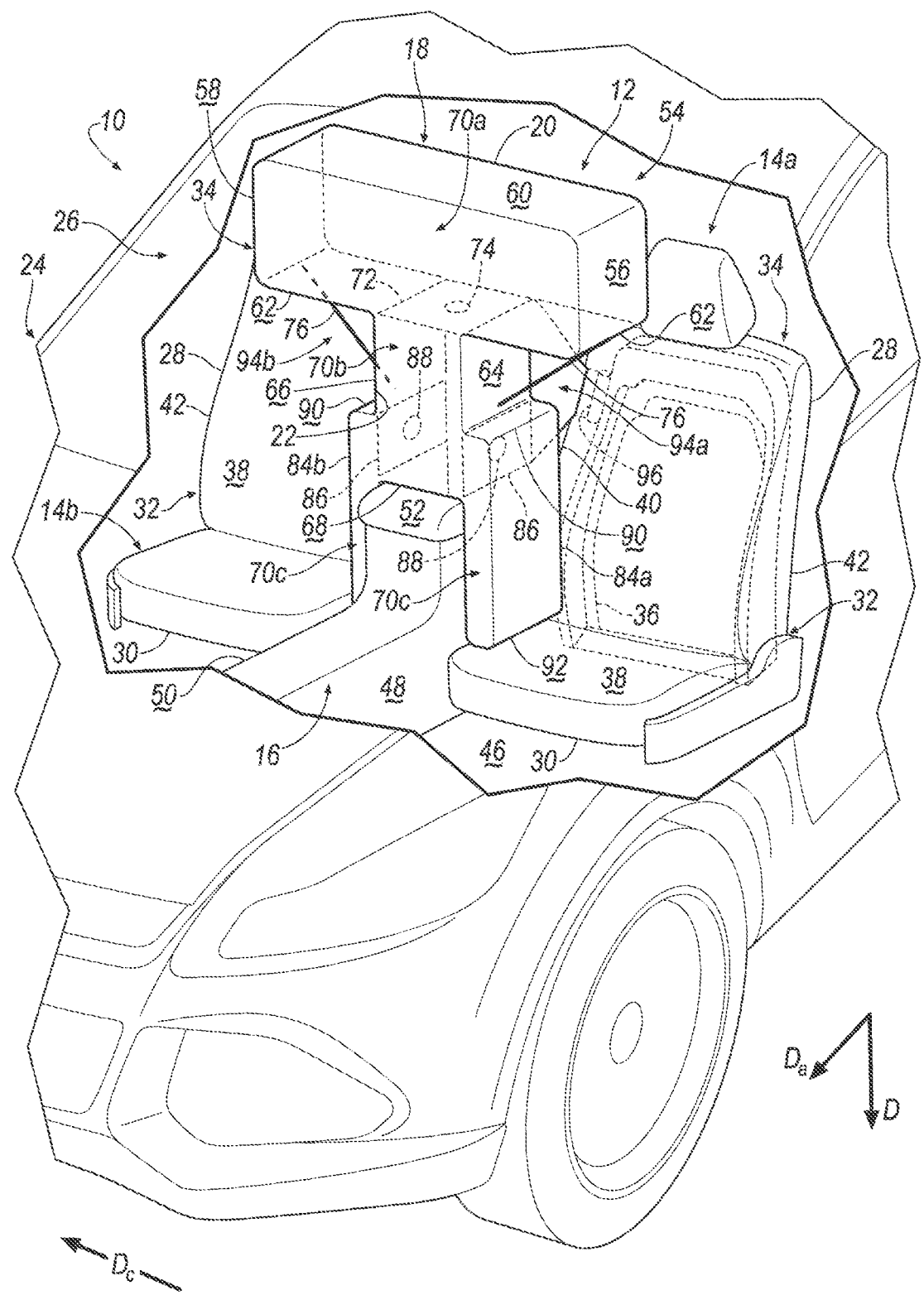
FIG. 5A is a perspective view of another embodiment of the airbag in the inflated position.
Figure 5B:
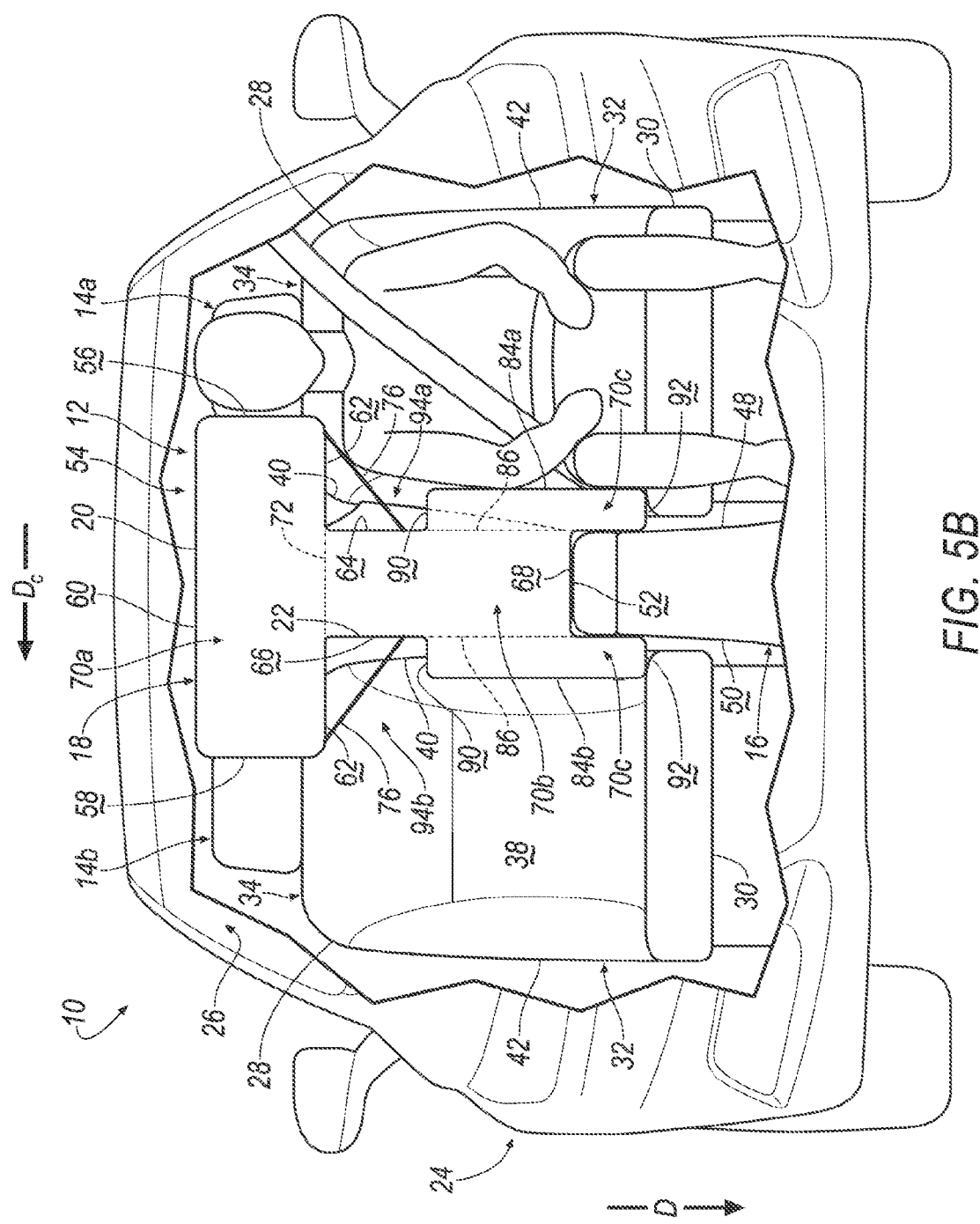
FIG. 5B is a front view of the embodiment of the airbag in the inflated position shown in FIG. 5A.
Figure 6:
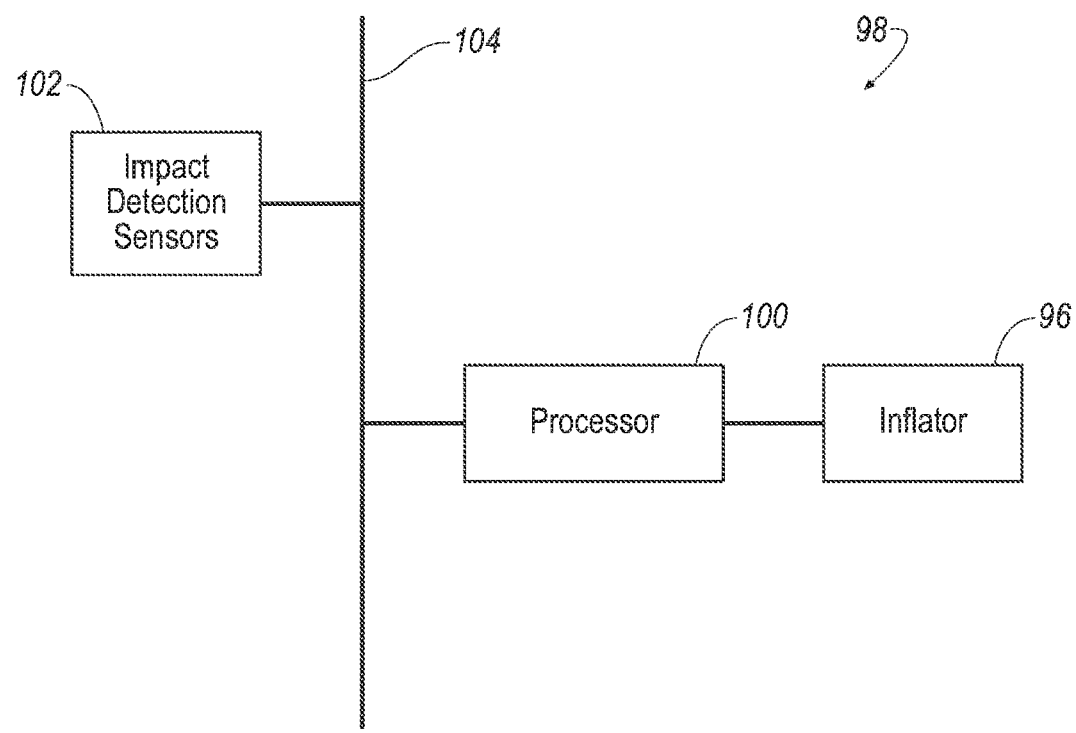
FIG. 6 is a block diagram of an inflation system of the vehicle.

In the embodiment shown in FIGS. 5A-5B, the first extension 84a is disposed in the same position as the extension 84 shown in FIGS. 4A-4B. The first extension 84a and the second extension 84b may be similar or identical, i.e., the extensions 84a, 84b, may be mirror images of each other. The second extension 84b may be elongated from the second leg 22 in the direction D. The second extension 84b is spaced from the first extension 84a in the cross-vehicle direction Dc. For example, the second extension 84b may be disposed between the second surface 50 of the center console 16 and the passenger seat 14b. In other words, the second extension 84b may extend from the second side 66 of the second leg 22. The second extension 84b may, for example, abut the center console 16. Alternatively, the second extension 84b may be spaced from the center console 16. The second extension 84b may extend between the center console 16 and the passenger seat 14b any suitable amount in the vehicle fore-and-aft direction Da.

Each extension 84 may be disposed adjacent to the lower end 32 of the respective seatback 28. Specifically, each extension 84 may be disposed adjacent a hip of an occupant between 5th-percentile female and 95th-percentile male stature sitting in the respective seat 14, as shown in FIGS. 4B and 5B. In other words, each extension 84 is positioned to receive and be impacted by the hip of the occupant, e.g., between 5th-percentile female and 95th-percentile male stature, seated in the respective seat 14 when the airbag 18 is inflated during an impact that urges the occupant towards the airbag 18.

With reference to FIGS. 4A-5B, each extension 84 may be elongated from a top 90 to a bottom 92 spaced from the top 90 in the direction D. The lower end 32 of the seatback 28 may, for example, be disposed between the top 90 and the bottom 92 of each extension 84. The bottom 92 of each extension 84 may extend farther in the direction D than the bottom 68 of the second leg 22. Said differently, the bottom 68 of the second leg 22 may be disposed between the first leg 20 and the bottom 92 of each extension 84 in the direction D. The bottom 92 of each extension 84 may, for example, abut the seat bottom 30 of the respective seat 14. In other words, the bottom 92 of each extension 84 may be disposed below the top 52 of the center console 16. Said differently, the bottom 92 of each extension 84 may be disposed between the floor 46 and the top 52 of the center console 16.

With continued reference to FIGS. 4A-5B, the top 90 of each extension 84 may be spaced from the first leg 20 in the direction D. The top 90 of each extension 84 may be disposed between the bottom 68 of the second leg 22 and the bottom 62 of the first leg 20. Said differently, each extension 84 may partially overlap the second leg 22. Specifically, the first extension 84a may partially overlap the first side 64 of the second leg 22, and the second extension 84b may partially overlap the second side 66 of the second leg 22.

With continued reference to FIGS. 4A-5B, the top 90 of each extension 84 and the bottom 62 of the first leg 20 may define a gap 94 therebetween. For example, in the embodiment shown in FIGS. 4A-4B, the airbag 18 may include one gap 94 facing the driver seat 14a. As another example, in the embodiment shown in FIGS. 5A-5B, the airbag 18 may include one gap 94a facing the driver seat 14a and another gap 94b facing the passenger seat 14b. The respective side 64, 66 of the second leg 22 may extend across the respective gap 94, i.e., from the top 90 of the respective extension 84 to the bottom 62 of the first leg 20. Each gap 94 may be disposed adjacent a shoulder of an occupant between 5th-percentile female and 95th-percentile male stature sitting in the respective seat 14. In other words, the respective side 64, 66 of the second leg 22 is positioned to receive and be impacted by the shoulder of the occupant, e.g., between 5th-percentile female and 95th-percentile male stature, seated in the respective seat 14 when the airbag 18 is inflated during an impact that urges the occupant towards the airbag 18. As shown in FIGS. 4A-5B, the external tethers 76 may be attached to the second leg 22 of the airbag 18 in the respective gap 94.

With continued reference to FIGS. 4A-5B, the inflation chamber 70 may extend into each extension 84. In other words, each extension 84 is inflatable from the uninflated position to the inflated position. The airbag 18 may include at least one lower baffle 86 disposed in the lower inflation chamber 70b. For example, the airbag 18 includes one lower baffle 86 for each extension 84. Each lower baffle 86 may extend across the lower inflation chamber 70b between the second leg 22 and the respective extension 84. In other words, each lower baffle 86 may extend across the inflation chamber 70, e.g., from the top 90 of the respective extension 84 to the bottom 68 of the second leg 22, along the second leg 22. In this situation, the lower baffle 86 may divide the inflation chamber 70 into the lower inflation chamber 70b and an extension inflation chamber 70c. The lower inflation chamber 70b may be defined by the second leg 22, the upper baffle 72, and the at least one lower baffle 86. The extension inflation chamber 70c may be defined by the respective extension 84 and the lower baffle 86.

With continued reference to FIGS. 4A-5B, the lower baffle 86 may include at least one vent 88. For example, the lower baffle 86 may include one vent 88, as shown in the Figures. As another example, the lower baffle 86 may include a plurality of vents 88 spaced from each other. Each vent 88 allows fluid communication through the lower baffle 86. In other words, each vent 88 allows fluid to flow between the lower inflation chamber 70b and the extension inflation chamber 70c. Said differently, the lower inflation chamber 70b is in fluid communication with the extension inflation chamber 70c through the at least one vent 88 of the lower baffle 86. Each vent 88 may have any suitable size, e.g., diameter, and shape, e.g., circle. Each vent 88 may be any suitable type of vent, e.g., an active vent, a passive vent, a one-way vent, etc.

The airbag assembly 54 may include an inflator 96 in fluid communication with the airbag 18 that inflates the airbag 18 from the uninflated position to the inflated position. The inflator 96 expands the airbag 18 with inflation medium, such as a gas, to move the airbag 18 from the uninflated position to the inflated position. The inflator 96 may be supported by any suitable component, e.g., the seatback 28, the base, etc. Specifically, the inflator 96 may be in fluid communication with the lower inflation chamber 70b, as shown in the Figures. In this situation, the inflator 96 may expand the lower inflation chamber 70b with inflation medium, which may flow through the at least one vent on the upper baffle 72 to expand the upper inflation chamber 70a.

The inflator 96 may be, for example, a pyrotechnic inflator that uses a chemical reaction to drive the inflation medium into the airbag 18. Alternatively, the inflator 96 may be, for example, a cold-gas inflator that, when activated, ignites a pyrotechnic charge that creates an opening for releasing the pressurized inflation medium to the airbag 18 via a fill tube (not shown). Alternatively, the inflator 96 may be of any suitable type, for example, a hybrid inflator.

With reference to FIG. 4, the vehicle 10 may include an inflation system 98 having a computer. The computer may be a microprocessor-based computing device implemented via circuits, chips, or other electronic components. For example, the computer may include a processor 100, memory, etc. The memory may store instructions executable by the processor 100 and the processor 100 may read the instructions from the memory and execute the instructions.

The processor 100 may be programmed to initiate an inflation of the airbag 18 in response to the vehicle impact.

The vehicle 10 may include impact detection sensors 102 programmed to detect the vehicle impact to the vehicle 10. The impact detection sensors 102 may be disposed in the vehicle 10. The impact detection sensors 102 may be of various types, e.g., pressure sensor, acceleration sensor, vision sensor, etc. When the vehicle impact occurs, the processor 100 may receive one or more signals from the impact detection sensors 102 indicating the vehicle impact. In response to receiving the signals from the impact detection sensors 102, the processor 100 may initiate the inflation of the airbag 18. Alternatively, the processor 100 may initiate the inflation of the airbag 18 selectively based on information from the impact detection sensors 102 identifying the physical characteristics of the vehicle impact, e.g., which side of the vehicle impacted, amount of pressure applied to the vehicle 10, etc. and also seat occupancy information, e.g., by using the occupancy sensors disposed inside the seats 14 sensing the occupancy status of the seats 14.

In order to receive the signals from the sensors, e.g., the impact detection sensors 102, and to initiate the inflation of the airbag 18, the processor 100 communicates with the sensors, e.g., the impact detection sensors 102, and the inflator 96, e.g., through a direct electrical wiring, through which an analog or a digital signal is transmitted, or through a communication network 104 like CAN (Control Area Network), Ethernet, LIN (Local Interconnect Network) or any other way.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the airbag 18 is in the uninflated position, under normal operating conditions of the vehicle 10. In the event of a far side oblique impact, the impact detection sensors 102 detect the impact. The impact detection sensors 102 transmit a signal indicating the far side oblique impact collision through the communication network 104 to the computer. When the far side oblique impact is detected, the computer transmits a signal through the communication network 104 triggering the inflator 96 to inflate the airbag 18 with inflation medium from the uninflated position to the inflated position. When the inflator 96 inflates the airbag 18 to the inflated position, the inflation medium flows into the lower inflation chamber 70b and through at least one vent 74 in the upper baffles 72 to the upper inflation chamber 70a, increasing the pressure in each of the lower inflation chamber 70b and the upper inflation chamber 70a. As the pressure is increased in the inflation chamber 70, the airbag 18 breaks through the tear seam 44 of the seatback 28. In this situation, the airbag 18 extends away from the inboard side 40 of the seatback 28, e.g., towards the other seat 14. As the occupant moves inboard, i.e., towards the other front seat 14, due to momentum of the far side oblique impact, the occupant moves towards the first leg 20 and the second leg 22. When the occupant impacts the airbag 18, the head of the occupant may impact the first leg 20, and the shoulder of the occupant may impact the second leg 22, such that the airbag 18 absorbs energy from the occupant. In other words, the airbag 18 may absorb energy from the occupant, which may assist in reducing head inboard excursion of the occupant.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
    a seat;
    a center console spaced from the seat in a cross-vehicle direction; and
    an airbag inflatable to an inflated position, the airbag in the inflated position including a first leg elongated in the cross-vehicle direction and spaced from the center console;
    the airbag in the inflated position including a second leg supported by the seat and elongated from the first leg towards the center console in a direction transverse to the cross-vehicle direction;
    wherein the first leg and the second leg each include a first side and a second side spaced from each other in the cross-vehicle direction, each of the first sides facing the seat;
    wherein the first side and the second side of the second leg are disposed between the first side and the second side of the first leg.

2. The system of claim 1, wherein the second leg bisects the first leg.

3. The system of claim 1, further comprising two external tethers spaced from each other in the cross-vehicle direction, each said external tether extending from the first leg to the second leg.

4. The system of claim 1, wherein the first leg is disposed adjacent a head of an occupant between 5th-percentile female and 95th-percentile male stature sitting in the seat.

5. The system of claim 1, wherein the first leg and the second leg each include a first depression facing the seat and a second depression facing away from the seat and spaced from the first depression in the cross-vehicle direction.

6. The system of claim 5, wherein the first depression of the first leg is disposed adjacent a head of an occupant between 5th-percentile female and 95th-percentile male stature sitting in the seat.

7. The system of claim 5, wherein the first depression of the second leg is disposed adjacent a shoulder of an occupant between 5th-percentile female and 95th-percentile male stature sitting in the seat.

8. The system of claim 5, wherein the airbag defines an inflation chamber and includes two internal tethers disposed in the inflation chamber, each said internal tether extending from the first depression to the second depression of the respective leg.

9. The system of claim 8, wherein the airbag includes an upper baffle extending across the inflation chamber between the first leg and the second leg and dividing the inflation chamber into an upper inflation chamber and a lower inflation chamber, the upper baffle including at least one vent.

10. The system of claim 1, wherein the airbag in the inflated position includes an extension elongated from the second leg in the direction, the extension is disposed between the center console and the seat.

11. The system of claim 10, further comprising a second extension elongated from the second leg in the direction, the center console disposed between the extension and the second extension.

12. The system of claim 10, wherein the extension is disposed adjacent to a hip of an occupant between 5th-percentile female and 95th-percentile male stature sitting in the seat.

13. The system of claim 10, wherein the airbag defines an inflation chamber and includes an upper baffle extending across the inflation chamber between the first leg and the second leg and dividing the inflation chamber into an upper chamber and a lower chamber, the upper baffle including at least one vent.

14. The system of claim 13, wherein the airbag includes a lower baffle extending across the inflation chamber between the second leg and the extension and dividing the inflation chamber into the lower chamber and an extension chamber, the lower baffle including at least one vent.

15. The system of claim 10, wherein the extension and the second leg each include a bottom spaced from the first leg in the direction, the bottom of the second leg disposed between the first leg and the bottom of the extension.

16. The system of claim 15, wherein the center console includes a top disposed between the bottom of the extension and the bottom of the second leg.

17. The system of claim 10, wherein the extension is spaced from the first leg in the direction, the extension and the first leg defining a gap therebetween.

18. The system of claim 17, wherein the gap is disposed adjacent to a shoulder of an occupant between 5th-percentile female and 95th-percentile male stature sitting in the seat.

19. A system comprising:
a seat;
a center console spaced from the seat in a cross-vehicle direction;
an airbag inflatable to an inflated position, the airbag in the inflated position including a first leg elongated in the cross-vehicle direction and spaced from the center console;
the airbag in the inflated position including a second leg supported by the seat and elongated from the first leg towards the center console in a direction transverse to the cross-vehicle direction; and
two external tethers spaced from each other in the cross-vehicle direction, each said external tether extending from the first leg to the second leg.

20. A system comprising:
a seat;
a center console spaced from the seat in a cross-vehicle direction; and
an airbag inflatable to an inflated position, the airbag in the inflated position including a first leg elongated in the cross-vehicle direction and spaced from the center console;
the airbag in the inflated position including a second leg supported by the seat and elongated from the first leg towards the center console in a direction transverse to the cross-vehicle direction;
the airbag in the inflated position including an extension elongated from the second leg in the direction, the extension being disposed between the center console and the seat;
the airbag in the inflated position including a second extension elongated from the second leg in the direction, the center console being disposed between the extension and the second extension.

* * * * *